Sept. 8, 1931.   J. E. JOHNSON   1,822,149
COUPLING
Filed Jan. 23, 1928
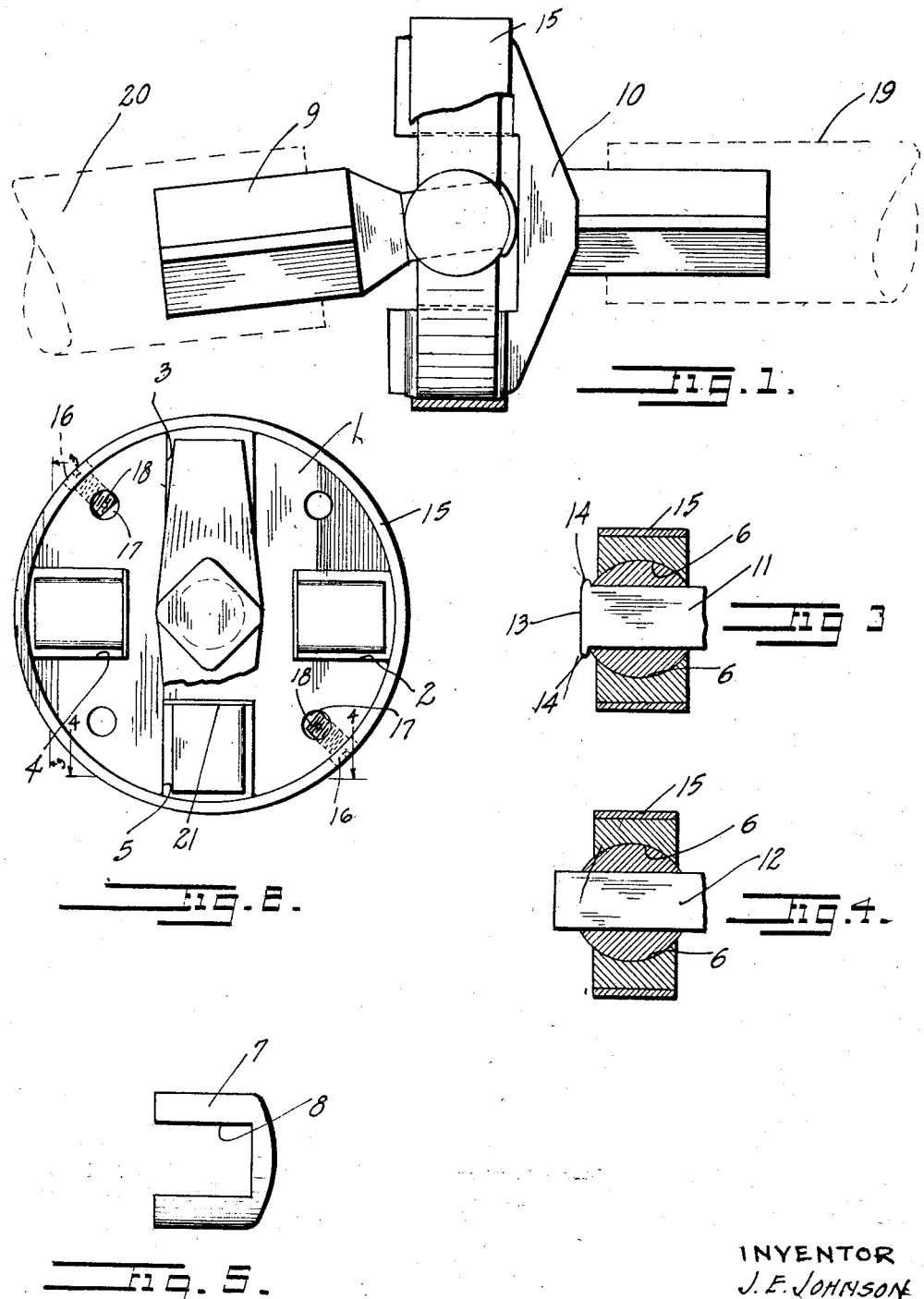
INVENTOR
J. E. JOHNSON
BY
ATTORNEYS Patented Sept. 8, 1931

1,822,149

UNITED STATES PATENT OFFICE

JOHN EDWARD JOHNSON, OF CHICAGO, ILLINOIS

COUPLING

Application filed January 23, 1928. Serial No. 248,811.

My invention relates to improvements in couplings and it consists in the combinations, constructions, and arrangements herein described and claimed.

An object of my invention is to provide a coupling which is adapted to be used for connecting shafts having their center lines out of alignment, and which has novel means for allowing unobstructed rotation of the shafts.

A further object of my invention is to provide a device of the type described which is especially adapted for use in connection with armatures, due to the adjustability for preventing a strain upon the armatures.

A further object of my invention is to provide a device of the type described in which the movable contact portions are interchangeable, thus lengthening the life of the device.

Other objects and advantages will appear in the following specification, and the novel features of the invention will be particularly pointed out in the appended claims.

My invention is illustrated in the accompanying drawings, forming part of this application, in which Figure 1 is a side elevation of my device, a portion thereof being broken away, Figure 2 is an end elevation of my device, a portion thereof being broken away, Figure 3 is a section along the line 3—3 of Figure 2, Figure 4 is a section along the line 4—4 of Figure 2, and Figure 5 is a detailed view of one of the bushings.

In carrying out my invention, I provide a body portion 1 having diametrically-opposed retaining recesses 2, 3, 4 and 5 disposed therein. These recesses are provided with arcuate-shaped walls 6 for retaining bushings 7 which are disposed within the recesses. The bushings 7 are substantially cylindrical in general contour. One end of each of the bushings is arc shaped, and each bushing is provided with a rectangular-shaped opening 8 extending from the opposite end and terminating short of said arc-shaped end.

Connecting forks 9 and 10 are provided. The fork 9 may be termed as a fixed fork for a reason hereinafter described, and the fork 10 may be termed as a movable fork. The forks 9 and 10 are substantially identical in construction, each being provided with substantially rectangular arm members. The arm members of the fork 9 are indicated at 11, and the arm members of the fork 10 are indicated at 12. The arm members 11 of the fork 9 have riveted ends 13, thus providing retaining beads 14. The arm members 12 of the fork 10 are relatively long and are similar in shape throughout. The fork members 9 and 10 may be provided with a connecting portion of any desired shape or size without departing from the spirit and scope of the invention.

The openings 8 of the bushings 7 are arranged to receive the arm members 11 and 12. A retaining ring 15 is disposed concentric with the body portion 1 for holding the bushings in their respective recesses. The retaining ring 15 is removably secured to the body portion 1 by locking screws 16 which pass into the body portion 1 through the retaining ring and terminate in laterally extending openings 17 in the body portion. The locking screws 16 are held in their locking positions by pins 18 which are passed through the screws and extend into the openings 17.

From the foregoing description of the various parts of the device, the operation thereof may be readily understood. It is obvious that the coupling may be used for operatively connecting any two shafts which are out of general alignment. But for an illustration which may bring out all the features of the invention let us assume that the coupling is employed for operatively connecting a motor shaft, i. e., a shaft from the armature of a motor to another shaft which is out of alignment with the motor or armature shaft. It is a well known fact that the armature must be in a floating position within the motor and that stress or strain applied to vary the position of the armature would be detrimental thereto. Let us assume that the fork 10 is operatively connected to the motor shaft indicated at 19 and that the fork 9 is operatively connected to a driven shaft indicated at 20. It is obvious that the fork 10 may be swung through an arc with respect to the body portion 1 employing the centers of its bushings as its axis. It will further be observed that the fork 9 may be swung through an arc in a plane which is at right angles to the plane of the arc through which the fork 10 may be swung. The fork 9, as will be noted, is swung about the centers of its bushings as its axis.

Let us assume that the motor, not shown, is in motion and that the motor shaft is rotating which will cause rotation of the coupling and the driven shaft 20. During the rotation of these parts, the pivotal connections of the forks with the body portion permit the ready rotation of the two shafts. Furthermore, the fact that the fork 10 is not rigidly held against lateral displacement gives a floating connection in the coupling, thus allowing for any unusual longitudinal movement. This also allows the coupling to connect two shafts which are out of general alignment with respect to each other, obviating the need of fine adjustments which are needed in some cases.

The body portion 1 may be constructed of any durable material, such as hardened steel, so that it will not wear. The bushings are made preferably of a less durable metal, such as bronze, babbitt, or other materials commonly used for bushings or bearings. Therefore the only frictional contacts are the contacts of the bushings with the arcuate-shaped wall 6 of the body portion 1. The main wear therefore is upon the bushings and these bushings may be readily removed by first removing the retaining ring 15. The life of the coupling may then be renewed by inserting new bushings. Fiber washers or discs 21 are disposed between the body portion 1 and each of the arms 11 and 12 and their respective bushings for the purpose of preventing a knocking of the metal parts together.

One of the main features of my invention is to provide removable or replaceable bushings. Due to the fact that the bushings may be removed and may be replaced by any bushings makes it possible to employ bushings constructed of various materials, such as brass, babbitt, bakelite, phosphor-bronze, fibroid, hard rubber or hard fiber. The last mentioned group of materials require little or no oil during the operation of the device, due to the contact between the bushings and the body portion which is to a great degree frictionless.

I claim:

1. A device of the type described comprising a cylindrical body portion having recesses extending inwardly from the periphery thereof, said recesses being provided with arcuate-shaped walls, cylindrical bushings carried in said recesses, each of said bushings having an opening therethrough, a fork having a pair of arms arranged to enter certain of said openings, a second fork having arms arranged to enter openings at right angles to the first-named openings, a retaining ring carried by said body portion for holding said bushings in position, locking screws for holding said retaining ring in position, a driving shaft member connected with one of said forks, and a driven shaft member connected with the other fork.

2. A device of the type described comprising a cylindrical body portion having recesses extending inwardly from the periphery thereof, said recesses being provided with arcuate-shaped walls, cylindrical bushings carried in said recesses, each of said bushings having an arc-shaped end conforming to and adapted to register with the outer surface of the cylindrical body portion and being provided with a rectangular opening extending from the opposite end of the bushing, a fork having a pair of arms arranged to enter certain of said openings, a second fork having arms arranged to enter openings at right angles to the first-named openings, a retaining ring carried by said body portion for holding said bushings in position, means for holding said retaining ring in position, a driving shaft member connected with one of said forks, and a driven shaft member connected with the other fork.

3. In a device of the type described, a cylindrical body portion having recesses extending inwardly from the periphery thereof, said recesses having arcuate-shaped walls, cylindrical bushings disposed in said recesses, each of said bushings having an arc-shaped end arranged to register with the periphery of the cylindrical body portion and being provided with an opening extending from the opposite end and terminating short of the arc-shaped end, and a retaining ring arranged to fit over the cylindrical body portion and in contact with the arc-shaped ends of the bushings for holding said bushings in position.

4. In a device of the type described, a cylindrical body portion having recesses extending inwardly from the periphery thereof, said recesses having arcuate-shaped walls, cylindrical bushings disposed in said recesses, each of said bushings having an arc-shaped end arranged to register with the periphery of the cylindrical body portion and being provided with an opening extending from the opposite end and terminating short of the arc-shaped end, a retaining ring arranged to fit over the cylindrical body portion and in contact with the arc-shaped ends of the bushings for holding said bushings in position, and means for maintaining said retaining ring in fixed position.

Signed at Chicago, in the county of Cook, and State of Illinois, this 20th day of January.

JOHN EDWARD JOHNSON.